Patented May 2, 1939

2,156,599

UNITED STATES PATENT OFFICE 2,156,599

ESTRADIOL ESTERS ESTERIFIED IN 3-POSITION AND PROCESS OF MAKING SAME

Karl Miescher, Riehen, and Caesar Scholz, Basel, Switzerland, assignors to the firm of Society of Chemical Industry in Basle, Basel, Switzerland No Drawing. Application October 7, 1937, Serial No. 167,865. In Switzerland November 20, 1936

11 Claims. (Cl. 260—397)

This invention relates to the production in a simple manner of pure compounds of the type of estradiol esterified in 3-position by treating a corresponding ester of the type of estrone with catalytically activated hydrogen in an aliphatic ester of low boiling point as solvent, especially ethyl acetate.

It is known that by reducing esters of estrone with hydrogen and platinum in the presence of alcohol free estradiol is produced with elimination of the acid residue. Also that by the hydrogenation of estrone acetate with hydrogen and a nickel catalyst in alcoholic solution a mixture is obtained from which estradiol-3-mono-acetate may be obtained, but only wastefully. By the present invention, on the other hand, the compounds of the type of estradiol esterified in 3-position are obtained directly in pure form.

Among compounds of the type of estrone are understood, for example, estrone, equilin or equilenin. By reduction of their keto-group to a carbinol-group these are converted into the corresponding compounds of the type of estradiol.

The new compounds find application in therapeutics.

The following examples illustrate the invention, the parts being by weight:

Example 1

1 part of estrone acetate and 0.25 part of platinum oxide are together shaken with 180 parts of ethyl acetate for 24 hours under 4 atmospheres hydrogen pressure. The platinum is filtered and the solvent distilled completely in a vacuum. The residual estradiol-3-mono-acetate is recrystallized from dilute methanol; it then melts at 136–137° C.

Example 2

1 part of estrone-propionate (melting point 135–136° C; made for example by the action of propionic anhydride on estrone in the presence of pyridine), 0.25 part of platinum oxide and 200 parts of ethyl acetate are shaken together at room temperature and under 4 atmospheres hydrogen pressure for 24 hours. After working up the reaction-product as described in Example 1 there is obtained estradiol-3-mono-propionate. After recrystallization from aqueous methanol or hexane this substance melts at 125–126° C.

Example 3

1 part of estrone-n-butyrate (melting point 101–102.5° C; made for example by the action of n-butyric anhydride on estrone in the presence of pyridine) and 0.25 part of platinum oxide are together shaken in 150 parts of ethyl acetate for 24 hours under 4.2 atmospheres hydrogen pressure. After filtration the solvent is distilled in the vacuum. The residual oil crystallizes gradually and may be purified by recrystallization from hexane. The estradiol-3-mono-n-butyrate then melts at 98–99° C.

As solvent there may equally well be used another aliphatic ester of low boiling point, for example methyl-propionate or ethyl-propionate.

Example 4

A mixture of 1 part of estrone-palmitate (melting point 75.5–76° C., made for example by the action of palmityl-chloride on estrone in the presence of pyridine), 200 parts of ethyl acetate and some platinum-oxide catalyst is shaken at room temperature for 24 hours under 4–4.1 atmospheres hydrogen pressure. When reduction is complete, the solution assumes a blue fluorescence. It is filtered and the solvent removed in a vacuum. The estradiol-3-mono-palmitate may be recrystallized from methanol and then melts at 70–71° C.

In quite analogous manner other 3-mono-esters of the type of estradiol may be obtained, for example the caprinate of melting point 60° C., the stearate of 78–78.5° C., the isobutyrate, the normal or iso-valerianate, the benzoate, the phenyl acetate, also corresponding carbonic acid esters and urethanes.

Instead of platinum, other catalysts, for instance palladium, nickel, cobalt or the like or mixtures thereof may be used.

The corresponding 3-mono-esters of dihydroequilenine are produced in quite analogous manner.

What we claim is:

1. A process for the manufacture of compounds of the type of estradiol esterified in 3-position, consisting in treating a corresponding ester of the type of estrone with catalytically activated hydrogen in an aliphatic ester of low boiling point as solvent.

2. A process for the manufacture of compounds of the type of estradiol esterified in 3-position, consisting in treating a corresponding ester of the type of estrone with catalytically activated hydrogen in the presence of platinum oxide as the catalyst and in an aliphatic ester of low boiling point as solvent.

3. A process for the manufacture of estradiol esterified in 3-position, consisting in treating a corresponding ester of estrone with catalytically activated hydrogen in the presence of platinum oxide as the catalyst and in an aliphatic ester of low boiling point as solvent.

4. A process for the manufacture of estradiol esterified in 3-position, consisting in treating a corresponding ester of estrone with catalytically activated hydrogen in the presence of platinum oxide as the catalyst and in ethyl acetate as solvent.

5. A process for the manufacture of estradiol-3-caprinate consisting in treating estrone-caprinate with catalytically activated hydrogen in the presence of platinum oxide as the catalyst and in ethyl acetate as solvent.

6. A process for the manufacture of estradiol-3-palmitate consisting in treating estrone-palmitate with catalytically activated hydrogen in the presence of platinum oxide as the catalyst and in ethyl acetate as solvent.

7. A process for the manufacture of estradiol-3-stearate consisting in treating estrone-stearate with catalytically activated hydrogen in the presence of platinum oxide as the catalyst and in ethyl acetate as solvent.

8. The estradiol esters esterified only in 3-position with aliphatic acid radicals.

9. The estradiol-3-caprinate of melting point 60° C.

10. The estradiol-3-palmitate of melting point 70–71° C.

11. The estradiol-3-stearate of melting point 78–78.5° C.

KARL MIESCHER.
CAESAR SCHOLZ.

DISCLAIMER 2,156,599.—*Karl Miescher*, Riehen, and *Caesar Scholz*, Basel, Switzerland. ESTRADIOL ESTERS ESTERIFIED IN 3-POSITION AND PROCESS OF MAKING SAME. Patent dated May 2, 1939. Disclaimer filed February 12, 1940, by the assignee, *Society of Chemical Industry in Basle*.

Hereby disclaims from the scope of claim 8 those estradiol esters which are esterified only in the 3-position with aliphatic acid radicals and which contain less than 3 carbon atoms in such radicals.

[*Official Gazette March 12, 1940.*]

oxide as the catalyst and in an aliphatic ester of low boiling point as solvent.

4. A process for the manufacture of estradiol esterified in 3-position, consisting in treating a corresponding ester of estrone with catalytically activated hydrogen in the presence of platinum oxide as the catalyst and in ethyl acetate as solvent.

5. A process for the manufacture of estradiol-3-caprinate consisting in treating estrone-caprinate with catalytically activated hydrogen in the presence of platinum oxide as the catalyst and in ethyl acetate as solvent.

6. A process for the manufacture of estradiol-3-palmitate consisting in treating estrone-palmitate with catalytically activated hydrogen in the presence of platinum oxide as the catalyst and in ethyl acetate as solvent.

7. A process for the manufacture of estradiol-3-stearate consisting in treating estrone-stearate with catalytically activated hydrogen in the presence of platinum oxide as the catalyst and in ethyl acetate as solvent.

8. The estradiol esters esterified only in 3-position with aliphatic acid radicals.

9. The estradiol-3-caprinate of melting point 60° C.

10. The estradiol-3-palmitate of melting point 70–71° C.

11. The estradiol-3-stearate of melting point 78–78.5° C.

KARL MIESCHER.
CAESAR SCHOLZ.

DISCLAIMER 2,156,599.—*Karl Miescher*, Riehen, and *Caesar Scholz*, Basel, Switzerland. ESTRADIOL ESTERS ESTERIFIED IN 3-POSITION AND PROCESS OF MAKING SAME. Patent dated May 2, 1939. Disclaimer filed February 12, 1940, by the assignee, *Society of Chemical Industry in Basle*.

Hereby disclaims from the scope of claim 8 those estradiol esters which are esterified only in the 3-position with aliphatic acid radicals and which contain less than 3 carbon atoms in such radicals.

[*Official Gazette March 12, 1940.*]